United States Patent [19]

Tordella

[11] 4,294,571
[45] Oct. 13, 1981

[54] VAN PLATFORM WITH LOCKABLE RAMP

[76] Inventor: Joseph R. Tordella, 128 B Elm Dr., Medford, N.J. 08055

[21] Appl. No.: 99,069

[22] Filed: Nov. 30, 1979

[51] Int. Cl.³ .............................................. B60P 1/00
[52] U.S. Cl. .................................................... 414/537
[58] Field of Search ...................... 414/522, 537, 538; 14/71.1; 308/3.6, 3.8

[56] References Cited

U.S. PATENT DOCUMENTS

| | | | |
|---|---|---|---|
| 2,094,401 | 9/1937 | Girl | 414/522 X |
| 2,839,013 | 6/1958 | Gunnell et al. | 410/113 |
| 2,880,040 | 3/1959 | Gomersall | 308/3.8 |
| 3,768,673 | 10/1973 | Nydam et al. | 414/537 X |
| 4,078,678 | 3/1978 | Tordella | 414/537 |

Primary Examiner—Robert G. Sheridan
Attorney, Agent, or Firm—Caesar, Rivise, Bernstein & Cohen, Ltd.

[57] ABSTRACT

A van platform including a housing for installation upon the floor of a van or truck. The housing includes a first floor located over the van floor to define a storage space therebelow, in which space a ramp is located. The ramp is arranged to be moved out of its retracted position in the housing space to an extended, inclined ramp-functioning position. The ramp includes rollers to facilitate movement of the ramp to the extended position. Upwardly inclined blocks are located within the housing and each includes an indentation for the reception of an associated roller as the ramp reaches a desired position adjacent the top surface of the first floor. The housing includes first locking means to lock the rollers within the associated indentations when the ramp is extended and second means for locking the ramp within the retracted position. The second means is in the form of a releasable handle which is also used to effect the extension of the ramp out of the housing.

12 Claims, 9 Drawing Figures

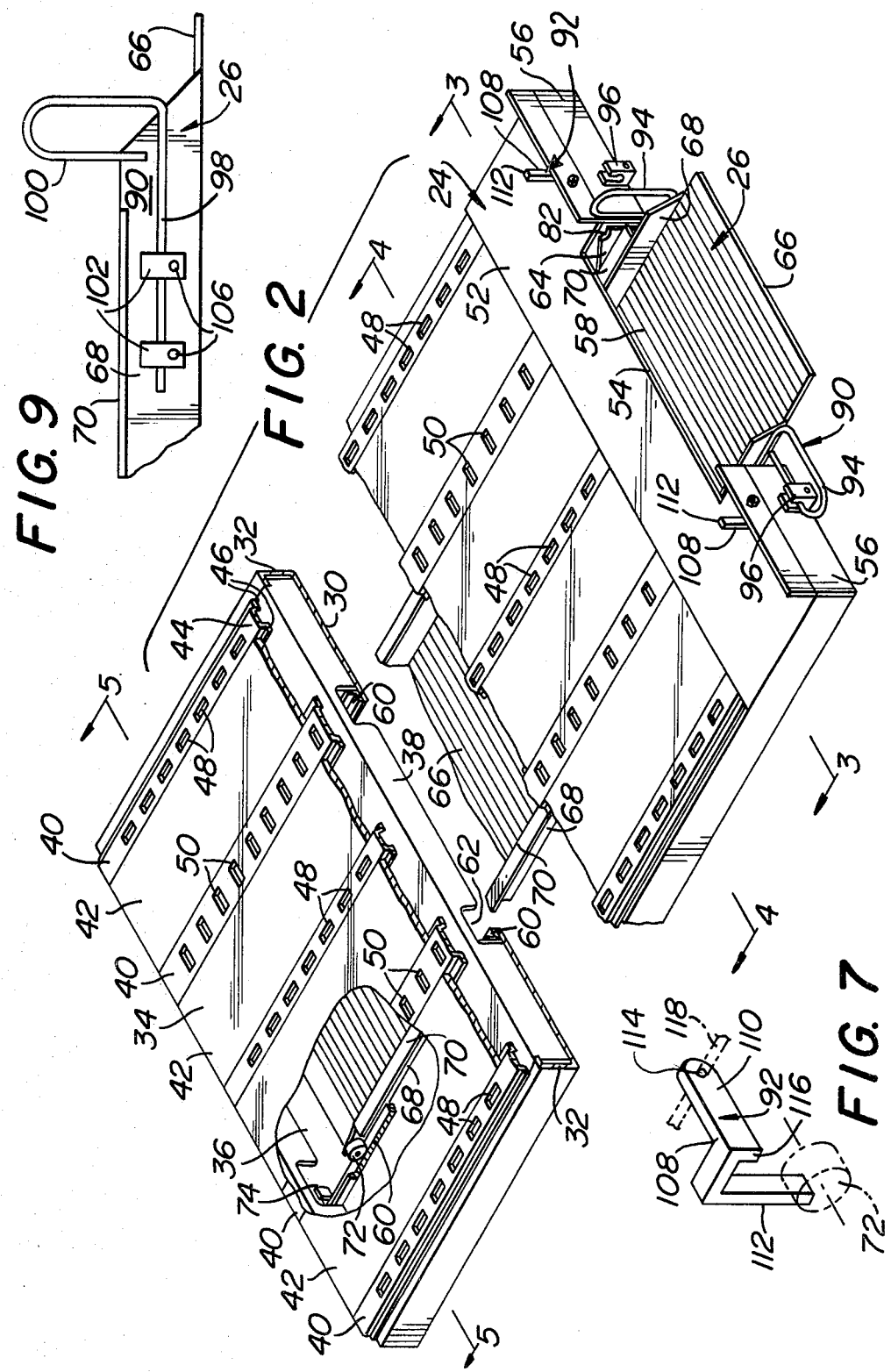

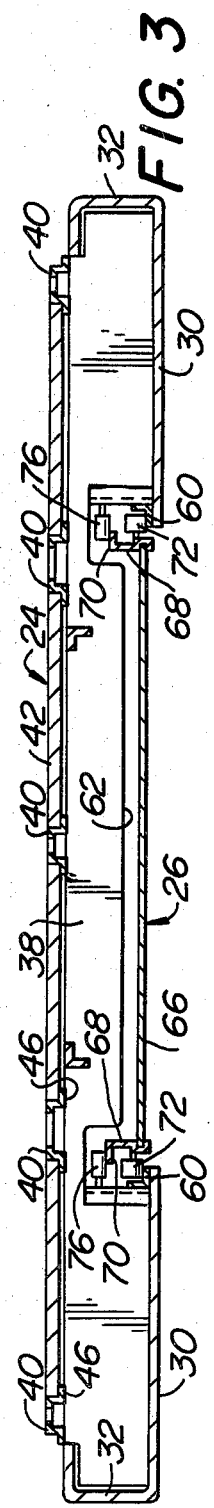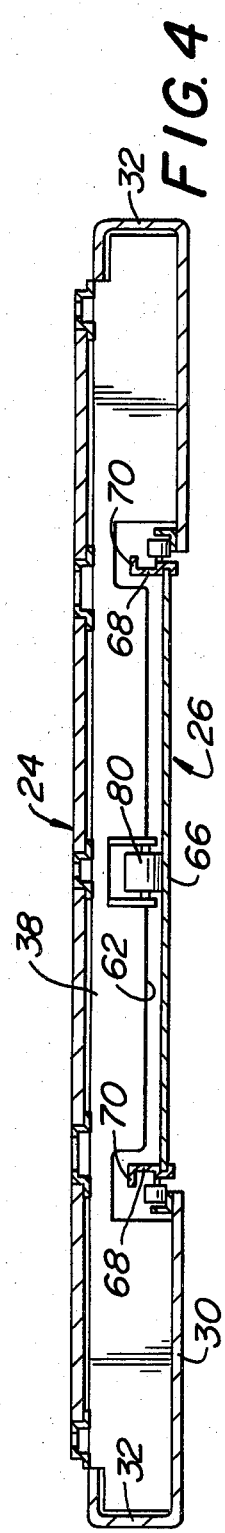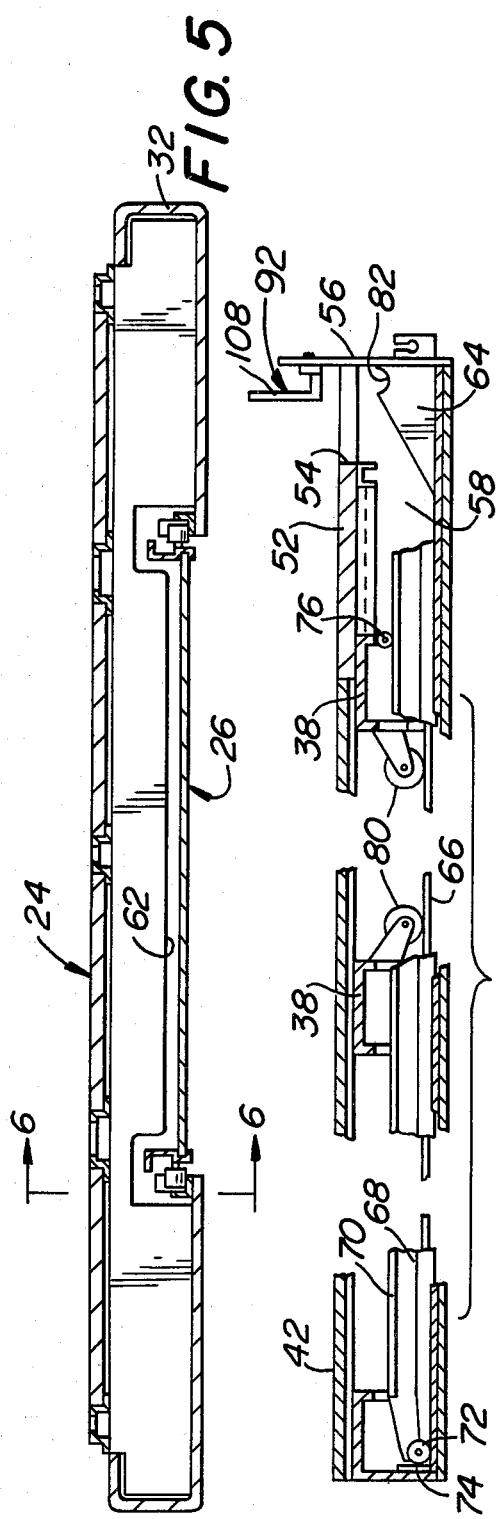

VAN PLATFORM WITH LOCKABLE RAMP

This invention relates generally to a van housing an extendable ramp and more particularly to a new and improved device of this general class.

In the transportation of heavy equipment from place to place, it is frequently necessary to move the equipment to and from the transportation vehicle, e.g., van, truck, etc. In common practice a board or plank is utilized as a ramp, but the use of such means is crude and not necessarily reliable since it may become separated from the vehicle. Also, there are storage problems when the board or plank is not in use.

In U.S. Pat. Nos. 1,717,303 and 1,884,513 there are disclosed ramps which are slidable in and out on tracks suspended beneath the floor of the vehicle. In U.S. Pat. No. 1,898,679 there is disclosed a ramp using channel irons with rear ends curved to form hooks. In U.S. Pat. No. 3,730,361 there is disclosed a collapsible ramp structure stored on a carrier beneath the vehicle. In U.S. Pat. No. 3,768,673 there is disclosed a collapsible, extendable and tiltable platform secured to the floor of a truck.

While the prior art devices, like those disclosed in aforenoted patents, may be generally suitable for their intended purposes, such devices tend to be complicated and expensive. Moreover, such devices appear unsuited for use over long periods of time with heavy equipment.

In my U.S. Pat. No. 4,078,678 there is disclosed and claimed a van platform which overcomes the disadvantages of the prior art. To that end, the van platform disclosed in my aforenoted patent comprises a housing for installation on the floor within the cargo holding body of a van or truck. The housing includes a special floor positioned in a spaced relationship with the van floor to define a space for holding a cargo-loading ramp. The ramp is normally stored in a retracted position within the space until needed when it is moved out of the space to an extended, typically, downwardly, inclined, ramp-functioning position. In the extended position the ramp can also be parallel to ground or even inclined upwardly for communication with a loading dock. The ramp includes rollers for facilitating the sliding movement of the ramp into and out of the housing. A pair of upwardly inclined edges are located within the space between the floors and each of the inclined edges includes an indentation at the top thereof for reception of the ramp rollers when the ramp reaches the fully extended position. When the ramp is in the fully extended position, it is inclined downwardly and outwardly with the ramp outer edge contacting a lower surface, such as the ground, and with the ramp inner edge being in close relationship to the outer edge of the special floor to provide a smooth transition from the ramp to the floor and without changing the thickness of the ramp and the floor.

While the van platform of my U.S. Pat. No. 4,078,678 provides a simple and inexpensive, yet viable means for moving equipment into or out of vans or other vehicles, in some cases the ramp is susceptible to accidental displacement, e.g., accidental extension from the stored position or retraction from the extended position.

Accordingly, it is the general object of the instant invention to provide a van platform which overcomes the disadvantages of the prior art and is an improvement of over the device of my U.S. Pat. No. 4,078,678.

It is a further object of the instant invention to provide a van platform having an extendable ramp with means for locking the ramp in the extended position.

It is a still further object of the instant invention to provide a van which is extendable from a retracted position to an extended position and which includes means for locking the ramp in the retracted position.

It is a yet further object of the instant invention to provide a van platform including an extendable ramp which is simple in construction and relatively low in cost.

The foregoing, as well as other objects of the instant invention are achieved by providing a van platform comprising a housing including first floor means terminating in an outer edge and defining a space thereunder. A movable ramp is located in the space and includes roller means to enable the ramp to be extended from a storage position in the space to a ramp-functioning position outside the space. Inclined plane means are positioned in the space. The inclined plane means are inclined upwardly and outwardly and each includes an indentation at the top thereof. The roller means engage the inclined plane means to facilitate movement of the ramp to and from the extended position, with the roller means being received in the indentations when the ramp is in the extended position. First locking means are provided for preventing the roller means from moving out of the indentations. The housing also includes second locking means for preventing accidental extension of the ramp from the retracted position.

Other objects and many of the attendant advantages of this invention will be readily appreciated as the same becomes better understood by reference to the following detailed description when considered in connection with the accompanying drawing wherein:

FIG. 2 is a perspective view, partially in section, of the van platform shown in FIG. 1 and wherein the ramp is in the stored or retracted position;

FIG. 3 is an enlarged sectional view taken along line 3—3 of FIG. 2;

FIG. 4 is an enlarged sectional view taken along line 4—4 of FIG. 2;

FIG. 5 is an enlarged sectional view taken along line 5—5 of FIG. 2;

FIG. 6 is a sectional view taken along line 6—6 of FIG. 5;

FIG. 7 is an enlarged perspective view of a portion of means for locking the ramp in the stored or retracted position;

FIG. 9 is a side elevational view of the end portion of the reamp.

Figure 1:
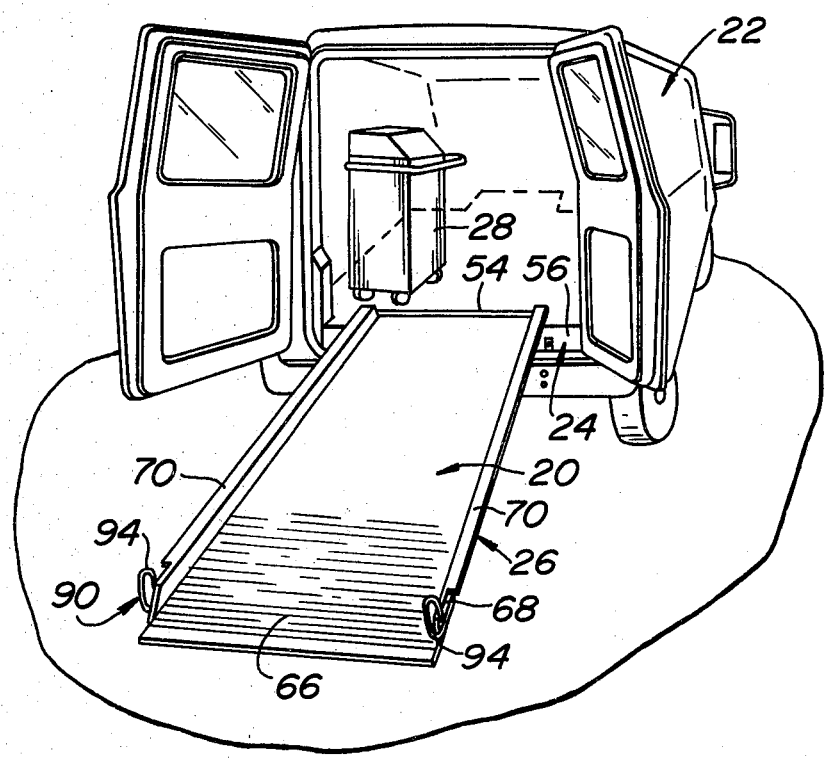
FIG. 1 is a perspective view of the rear end of a van, showing an embodiment of the present invention wherein the ramp has been brought to an extended, inclined, ramp-functioning.

Referring now in greater detail to the various figures of the drawing wherein like reference characters refer to like parts, there is shown generally at 20 a platform housing of the present invention disposed within the cargo storage area of a van 22. It must be pointed out at this juncture that while the platform 20 is shown disposed within a van 22, it is clear that the platform can be used in other types of cargo carrying vehicles, such as trucks, etc.

The van platform basically comprises a housing 24 having an extensible-retractable ramp 26. The ramp is arranged to be extended out of the housing when it is desired to move equipment into or out of the van. In such use the ramp 26 is typically extended from the housing so that it extends downwardly and outwardly as shown in FIG. 1 with its free end disposed on the ground or a floor. Accordingly, equipment 28 can be readily slid up or down the ramp as desired to facilitate the loading or unloading of the van. When the ramp is not needed it is retracted fully within the housing 24.

As can be seen in FIG. 2, the housing 24 is a generally hollow structure including a bottom floor 30, a pair of longitudinally extending sidewalls 32 and an upper floor 24. The ramp 26 is maintained in the space 36 between the lower floor 30 and the upper floor 34. The housing 24 is located within the van body so that the lower floor 30 is disposed on the floor of the van body. When disposed thusly, upper floor 24 of the housing serves as the cargo-carrying floor for the van. In practice, the thickness or height of the housing 24 is very shallow, e.g., only 4 inches (10.1 cm) so that the housing does not occupy a significant amount of the payload space of the van.

The housing is generally of the width of the van's interior and extends for virtually the entire cargo carrying area. The upper floor 34 is supported by a plurality of transversely extending channel-shaped cross members 38 which are secured, such as by welding, to the bottom floor 30. The top floor 34 comprises a plurality of longitudinally extending tracks 40 and interposed longitudinally extending planks 42. Each of the tracks is a generally channel-shaped member having a central or web portion 44 and a pair of flanges 46 parallely offset therefrom. The flanges 46 serve as the means to support the planks 42, via the longitudinally extending edges thereof. To that end, the flanges 46 are offset from the top surface of the web portion 44 of the track 40 by the same dimension as the thickness of the planks 42. Accordingly, the top surface of each plank 42 is flush with the top surface of the associated track 40, thereby resulting in a smooth floor for supporting cargo thereon. Each of the tracks is a conventional structure including a plurality of slots therein. The slots 48 in the outer tracks and the center track extend longitudinally while the slots 50 in the two intermediate tracks 40 extend transversly. The slots 48 and 50 serve as means for receiving conventional cargo retaining straps. The slots also serve as means for enabling shelves, security screens, etc. to be secured to the floor.

As can be seen, the forward end 52 of the upper floor 34 is in the form of a plate extending the full width of the upper floor. The plate 52 includes a central cut-out or recess 54. A pair of plates 56 are located on respective sides of the recess 54 and abut the edge of the plate 52. The plates 56 also abut the edge of sidewalls 32 and bottom wall 30 to form the frontwall of the housing. The space between the end plates 56 forms the access passageway 58 or mouth of the frontwall through which the ramp 26 is extended or retracted.

As can be seen in FIGS. 2-5, the lower floor 30 is in the form of two longitudinally extending portions 57 which are spaced apart and which extend the full length of the housing. Respective guide tracks 62 are secured to the inner surface of the floor portions 57 along the edges thereof. The tracks 60 serve as a guide for directing the proper extension and retraction of the ramp with respect to the housing.

As can be seen in FIG. 3-5 each cross member 38 includes a suitably configured recess 62 in its sidewalls to form the passageway 58 through which the ramp 24 moves.

A pair of inclined blocks 64, to be described in detail later, are mounted adjacent the forward ends of the tracks 60 and communicate with the mouth of passageway 58, i.e. the space defined between the recess 54 in the top wall 34 and the spaced end plates 56.

As can be seen clearly in FIGS. 1 and 2, the ramp 26 basically comprises an elongated base portion 66 and a pair of channel shaped sidewalls 68 extending along each side of the base. The free edge of each of the sidewalls 68 terminates in a horizontally projecting flange 70.

As can be seen clearly in FIG. 2 and 6, a roller 72 is mounted on each sidewall 68 at the inner end. Each roller is mounted so that it can rotate about a horizontal axis to enable the roller to roll along the track 60. A stop member 74 is located at the inner end of each of the tracks 60 to prevent the ramp 26 from being retracted too far into the housing.

In order to facilitate the extension of the ramp the housing includes plural guide or hold-down casters and rollers. To that end, as can be seen in FIGS. 3, 4 and 6, a pair of hold-down rollers 76 are mounted on the cross member 38 closest to the mouth 54. Each of the rollers 76 is disposed over an associated track 60 so as to engage and roll along the horizontal flange 70 of each of the sidewalls 68 of the ramp 26 as the ramp is extended or withdrawn. In addition each of the two forwardmost cross members 38 include a respective hold-down caster 80 mounted thereon for engagement with the top surface of the ramp base 66.

As will be appreciated by those skilled in the art, the rollers 76 engaging the flanges 70 and the casters 80 engaging the ramp base 66 insure that when the ramp is retracted or extended by the rolling of rollers 72 on associated tracks 60, the ramp does not skew, but remains horizontal. This action is of considerable importance to facilitate the retraction and extension of the ramp.

As can be seen clearly in FIG. 6, the inclined blocks 64 are located at the mouth of the passageway 58, with one inclined block disposed on each side of the ramp. Each of the blocks 64 includes an upwardly inclined edge terminating at its top in an arcuate indentation 82. Each indentation is adapted to receive a respective roller 72 when the ramp 26 is fully extending from the housing. The presence of end plates 56 precludes the ramp from being completely withdrawn from the housing since such plates act as a forward stop for the rollers 72.

In accordance with the teachings of my aforenoted patent the inclined blocks 64 and their indentations 82 are configured such that when the ramp is extended fully and inclined downward, like that shown in FIG. 1, the inner edge of the ramp and outer edge 54 of the top wall are meet in a good mating relationship, e.g. are approximately flush. This feature is of considerable importance to enable equipment to be rolled into and out of the van with no drop or bump between the ramp and the floor 32.

As mentioned heretofore, the instant invention includes means for locking the ramp in either its extended or retracted positions. The means for locking the ramp in the retracted position fully within the housing is designated generally by the reference numeral 90

Figure 8:
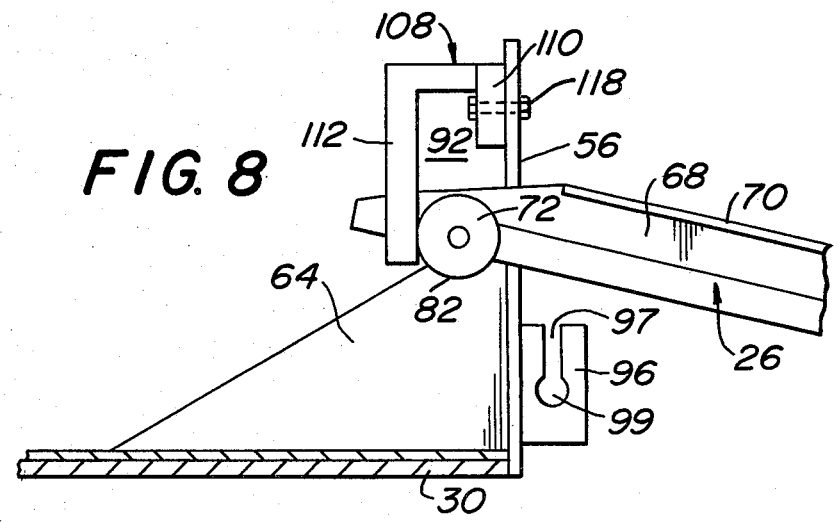
FIG. 8 is a side elevational view, partially in section, of a portion of the means for locking the ramp in the extended position.

(FIGS. 2 and 9) while the means for locking the ramp in its fully extended position outside the housing is designated generally by the reference numeral 92 (FIG. 8). The means 90, in addition to locking the ramp within the housing, also functions as means for facilitating the extension of the ramp out of the housing.

The means 90 is best seen in FIGS. 7, 8 and 9, and basically comprises a pair of locking handles 94, one on each side of the ramp. Each handle is arranged to engage a respective locking block or clamp 96 on each end plate 56 of the housing to secure the handles within the clamps. Each locking clamp is a generally U-shaped member comprising a vertical slot or mouth 97 (FIG. 8) terminating at its lower end in a circular notch 99. The clamp is preferably formed of a resilient material, e.g., nylon.

Each handle is formed of circular rod stock and comprises a linearly extending shank portion 98 (FIG. 9) and a loop-shaped free end portion 100 extending generally perpendicular to the shank portion. The shank portion of each handle is mounted on a respective sidewall of the ramp, via a pair of mounting blocks 102. Each block is secured to the sidewall of the ramp by a respective screw or bolt 106. Each block forms a passageway (not shown) parallel to the sidewall of the ramp and which is axially aligned with the passageway formed by the other block of the pair. The shank portion of the handle extends through the aligned passageways with sufficient clearance so that the looped end 100 of the handle can be pivoted through an arc of approximately 90° about the longitudinal axis of the shank between a horizontal or "locked" position and a vertical or "released" position. In FIG. 2 the left-most handle 94 is shown in the "locked" position while the right-most handle is shown in the "released" position.

In the locked position the looped portion of the handle has passed through the slot 97 in the clamp 96 and is snap-fit within the circular notch 99. This action effectively secures the ramp against accidental extension out of the mouth of the housing.

When it is desired to extend the ramp, each handle 94 is rotated to the vertical position, thereby freeing it from its associated clamp. The looped portion of each handle also serves as a convenient hand grip for pulling the ramp out of the housing to the extended position.

When the ramp is in the fully extended position, as described heretofore, the locking means 92 is engaged to insure that the ramp remains in the extended position, irrespective of the inclination of the ramp. As best seen in FIGS. 7 and 8, the locking means 92 comprises a pair of pivotable latches 108, one of which is mounted on one end plate 56 immediately adjacent the inclined block 64. The other latch 108 is mounted in a corresponding position on the other end plate 56. Each latch comprises an elongated base portion 110 and a locking finger 112. The base portion 110 is an elongated member having an end through which a hole 114 extends and an opposed end 116 from which the finger projects. The finger 112 extends perpendicularly to longitudinal axis of the base portion 110 but is offset from the plane thereof. Each latch is mounted on its associated end plate, via a bolt 118, extending through its hole 114. Accordingly, each latch is pivotable about the axis of the bolt between a "released" position wherein the finger 112 extends vertically upward and a "locked" position wherein the finger extends vertically downward.

As seen in FIGS. 7 and 8, the finger 112 is offset from the plane of the base portion of the latch by a sufficient distance such that when the latch is in the locked position, the finger is located immediately behind the ramp roller 72. This action effectively locks the roller within the indentation 82 on the inclined block 64 to prevent accidental retraction or inward movement of the ramp.

When it is desired to retract the ramp within the housing, each of latches 108 is rotated about the axis of its bolt to the position shown in FIG. 2, thereby freeing the rollers 72. The ramp may then be lifted by the handles until it is parallel to the housing and then pushed fully into the housing. The handles are then pivoted downward to lock them within their associated clamps to secure the ramp within the housing.

While the present invention has been illustrated in connection with a hollow body cargo carrying vehicle, it is clear that the invention can be used in connection with stationary installations as well, e.g., a loading dock. In some instances, the inclined blocks may be dispensed with.

In accordance with the practical embodiment of the aforedescribed invention, the planks of the upper floor are formed of the wood, the tracks of the upper floor, the inclined blocks, the ramp tracks, the latches and the handles are formed of steel, the sidewall, bottom wall and cross-pieces of the housing and the ramp are formed of aluminum, the top plate forming the mouth of the platform is formed of diamond-plate steel and the rollers and clamping blocks are formed of nylon.

As will be appreciated from the foregoing, the instant invention serves as a self-storing loading ramp for location within the cargo carrying body of a vehicle or on a stationary structure such as a cargo dock. The construction of the platform enables the ramp to be extended fully out of the platform simply and expeditiously. The locking means associated with the inclined blocks insure that the ramp remains in its fully extended position irrespective of whether or not the ramp is extended downward (as is the usual case) or is horizontal or at a reverse incline for communication with loading docks, etc. The means for locking the ramp in its retracted position insures against accidental displacement of the ramp such as could occur as a result of vehicle acceleration. Furtherstill, the use of the floor construction having the connection slots enables the van platform to carry all types of cargo, via the use of conventional hold-down straps, shelves or security screens.

Without further elaboration, the foregoing will so fully illustrate my invention that others may, by applying current or future knowledge, readily adapt the same for use under various conditions of service.

What is claimed as the invention is:

1. A van platform comprising a housing including first floor means terminating outwardly in an outer edge and defining a space thereunder, movable ramp means located in said space and having roller means to enable said ramp means to be extended from a retracted position within said space to an extended, ramp-functioning position outside said space, a pair of inclined guides positioned in said space adjacent the outer edge of said first floor, each of said guides being inclined upwardly and outwardly and including an indentation at the top thereof, said rollers being arranged to engage said inclined guides to facilitate movement of said ramp means to and from the extended position, at least one of said rollers being received in said indentation when said ramp means is brought to the extended position, and first releasable locking means for preventing said roller from moving inwardly out of said indentation when said ramp means is in said extended ramp functioning position, said releasable locking means comprising at least one stop member located adjacent said indentation and a movable to a position immediately inward of said indentation to engage the roller disposed therein.

2. The van platform of claim 1 wherein said stop member is connected to said first floor means.

3. The van platform of claim 2 wherein said stop member is pivotable.

4. A van platform comprising a housing including first floor means terminating outwardly in an outer edge in said space and having roller means to enable said ramp means to be extended from a retracted position within said space to an extended, ramp-functioning position outside said space, a pair of inclined guides positioned in said space adjacent the outer edge of said first floor, each of said guides being inclined upwardly and outwardly and including an indentation at the top thereof, said rollers being arranged to engage said inclined guides to facilitate movement of said ramp means to and from the extended position, at least one of said rollers being received in said indentation when said ramp means is brought to the extended position, first releasable locking means for preventing said roller from moving inwardly out of said indentation when said ramp means is in the extended ramp functioning position and second locking means for preventing accidental extension of said ramp means from the retracted position.

5. The van platform of claim 4 wherein said second locking means comprises handle means connected to said ramp means and clamping means connected to said housing.

6. The van platform of claim 5 wherein said handle means is movable into and out of said clamping means.

7. The van platform of claim 6 wherein said ramp means includes an outer edge and wherein said handle is disposed adjacent one side of said ramp means at said outer edge, said handle being pivotable about an axis parallel to the longitudinal axis of said ramp means for engagement with and disengagement from said clamping means.

8. The van platform of claim 7 wherein said first locking means comprises at least one movable latch member.

9. The van platform of claim 8 wherein said stop member is arranged to be moved to a position immediately inward of said indentation to engage the roller disposed therein.

10. The van platform of claim 9 wherein said stop member is connected to said housing.

11. The van platform of claim 9 wherein said first floor means includes at least one longitudinally extending track having plural mounting slots therein and at least one removable panel member mounted on said track.

12. The van platform of claim 11 additionally comprising hold-down roller means mounted within said space for engaging a top surface of said ramp to guide its extension out of said space.

* * * * *